US010276038B2

(12) United States Patent
Hastings (10) Patent No.: US 10,276,038 B2
(45) Date of Patent: Apr. 30, 2019

(54) REMOTE NOTIFICATION SYSTEM FOR MEDICAL DEVICES

(71) Applicant: Mark Hastings, Blue Springs, MO (US)

(72) Inventor: Mark Hastings, Blue Springs, MO (US)

( * ) Notice: Subject to any disclaimer, the term of this patent is extended or adjusted under 35 U.S.C. 154(b) by 0 days.

(21) Appl. No.: 15/423,258

(22) Filed: Feb. 2, 2017

(65) Prior Publication Data

US 2017/0270763 A1   Sep. 21, 2017

Related U.S. Application Data

(60) Provisional application No. 62/310,518, filed on Mar. 18, 2016.

(51) Int. Cl.

| G08B 1/08 | (2006.01) |
|---|---|
| G08C 17/02 | (2006.01) |
| H04W 4/02 | (2018.01) |
| H04L 29/08 | (2006.01) |
| H04W 4/14 | (2009.01) |

(52) U.S. Cl.
CPC .............. *G08C 17/02* (2013.01); *H04L 67/12* (2013.01); *H04L 67/18* (2013.01); *H04L 67/22* (2013.01); *H04W 4/02* (2013.01); *H04W 4/027* (2013.01); *G08C 2201/31* (2013.01); *H04W 4/14* (2013.01)

(58) Field of Classification Search
None
See application file for complete search history.

(56) References Cited

U.S. PATENT DOCUMENTS

| 9,603,524 | B2* | 3/2017 | Park ................... A61B 5/0002 |
| 2012/0095844 | A1* | 4/2012 | Barnes, Jr. .......... G06Q 10/1053 |
| | | | 705/14.69 |
| 2013/0304142 | A1* | 11/2013 | Curtin ................. A61N 1/3975 |
| | | | 607/5 |
| 2014/0163425 | A1* | 6/2014 | Tran .................... G06F 19/3418 |
| | | | 600/595 |
| 2014/0278229 | A1* | 9/2014 | Hong ..................... A63B 71/06 |
| | | | 702/160 |
| 2014/0288435 | A1* | 9/2014 | Richards ............ A61B 5/02427 |
| | | | 600/479 |
| 2016/0292737 | A1* | 10/2016 | Barnes, Jr. .......... G06Q 10/1053 |
| 2017/0119966 | A1* | 5/2017 | Moberg ................. A61M 5/172 |

* cited by examiner

*Primary Examiner* — Julie B Lieu (57) ABSTRACT

A monitoring device that serves as a remote notification system and provides communication between a medical device and a remote computing device. The monitoring device is installed in the medical device and has a microcontroller that is synched with a main board of the medical device, allowing signals and commands to be transmitted between the microcontroller and the main board. A transceiver is electrically connected to the microcontroller and allows for communication between the microcontroller and the remote computing device over a wireless network. The microcontroller monitors the medical device and sends an alert to the remote computing device when an undesirable states is detected. A dashboard application on the remote computing device allows a user to view alerts and initiate a plurality of medical device functions from a remote location.

19 Claims, 10 Drawing Sheets

REMOTE NOTIFICATION SYSTEM FOR MEDICAL DEVICES

The current application claims a priority to the U.S. Provisional Patent application Ser. No. 62/310,518 filed on Mar. 18, 2016.

FIELD OF THE INVENTION

The present invention relates generally to monitoring medical devices. More specifically, the present invention provides a monitoring device for controlling a medical device remotely and alerting a user of undesirable states.

BACKGROUND OF THE INVENTION

Negative pressure wound therapy (NPWT) is a medical technique which induces healing through application of a vacuum to a wound through a sealed dressing. With this, sealed wound dressings connect to a vacuum pump to control the application of sub atmospheric pressure. NPWT units may be used in medical centers (hospitals, doctor's offices, etc.), however, it is common for them to be used inside of homes. In general, healthcare professionals diagnose alerts produced by NPWT units over the phone when it is late. This technique is only somewhat effective, as communication errors often occur, thus producing additional problems and confusion. Because of this, inventors have developed NPWT units and other medical devices which alert healthcare professionals from remote locations, however, there such inventions lack the output of several important alerts necessary to keep everything running smoothly for extended periods of time.

It is therefore an objective of the present invention to introduce a remote notification system for a negative pressure wound therapy unit. The present invention utilizes an NPWT unit capable of sending wireless notifications to an online dashboard application which may be accessed in remote locations, via a wireless network. Alerts which appear on the NPWT unit will be relayed to an internal microcontroller and transmitted out to the corresponding dashboard application which may be accessed on a remote computing device, such as a laptop or smartphone. Upon logging into the dashboard application, users will be able to diagnose the alert and figure out the proper course of action. The dashboard application will give full remote access to the NPWT unit, allowing users to troubleshoot and track any potential problems which may occur from a far. Additionally, the system allows for better overall safety of patients and in total, bettering the overall continuum of care within the home health and long term care markets. While the preferred embodiment is intended to be used with a NPWT unit, it is an object of the present invention to provide a device that can be used in any medical device.

DETAIL DESCRIPTIONS OF THE INVENTION

All illustrations of the drawings are for the purpose of describing selected versions of the present invention and are not intended to limit the scope of the present invention.

Figure 1:
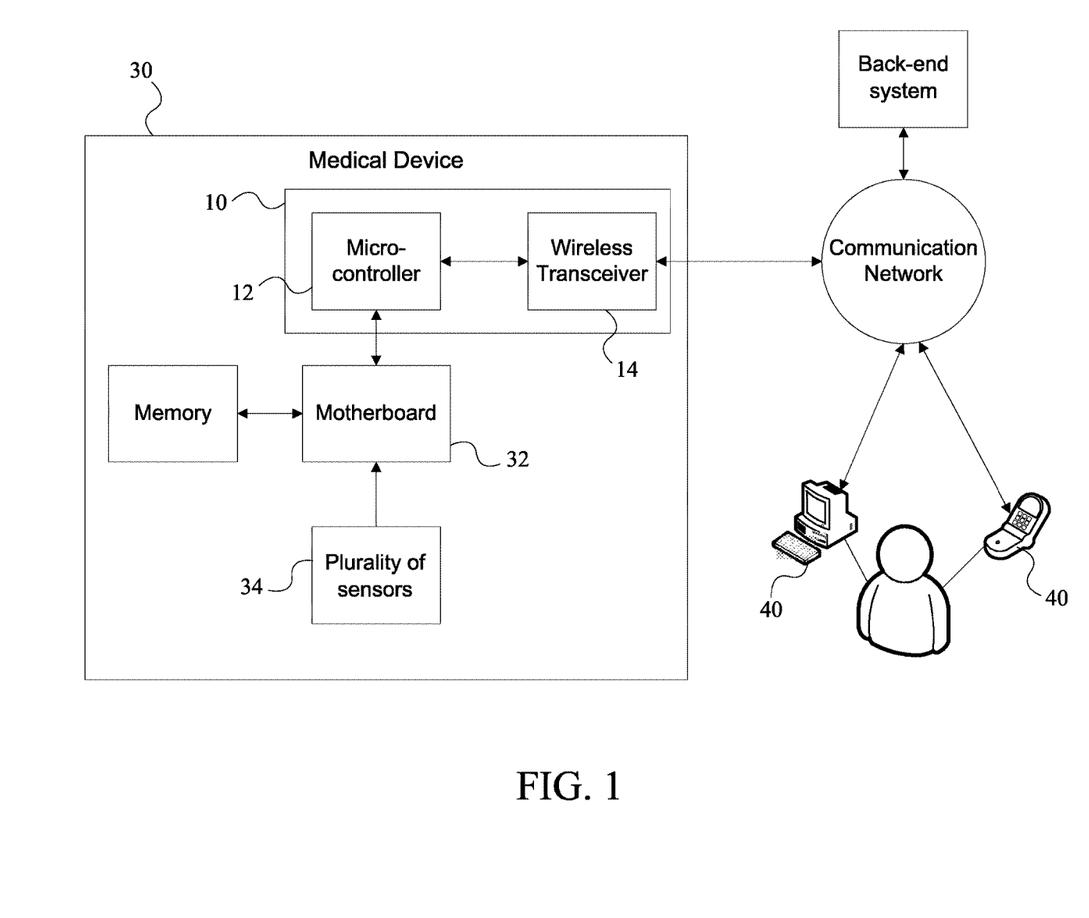
FIG. 1 is a diagram depicting the communication between the medical device and the remote computing device via the monitoring device, using a wireless communication network.

The present invention is a monitoring device 10 that serves as a remote notification system and provides communication between a medical device 30 and a remote computing device 40. The monitoring device 10 is integrated into the medical device 30 as depicted in FIG. 1, such that the monitoring device 10 can control the medical device 30 and monitor various parameters and states of the medical device 30. Data collected from the medical device 30 is displayed on the remote computing device 40 through a dashboard application, wherein the commands can also be sent to the medical device 30 via the dashboard application. The dashboard application can be hosted by a back-end system, rooted on the remote computing device 40, or a combination thereof.

The remote computing device 40 is any electronic device that is capable of wirelessly communicating with a transceiver 14 of the monitoring device 10. For example, the remote computing device 40 can be a laptop, smartphone, or tablet. In reference to FIG. 4, the monitoring device 10 is installed in and synchronized with the medical device 30, such that data can be transferred between a microcontroller 12 from the monitoring device 10 and a main board 32 of the medical device 30. Examples of the medical device 30 include a negative pressure wound therapy (NPWT) unit, an enteral feeding pump, an infusion pump, a compression pump, a ventilator, or a continuous positive airway pressure (CPAP) pump.

While the present invention is hereinafter described in conjunction with the medical device 30 being a NPWT unit, it is to be understood that the present invention is not limited in its application to the details of the components and arrangements as described or illustrated. The present invention is capable of other embodiments and of being utilized and carried out in various ways not explicitly described herein but that can be reasonably conjectured within the scope of medical devices. It is also to be understood that the phrasing and terminology employed herein are for the purpose of description and should not be regarded as limiting.

The present invention allows the medical device 30 to be utilized in homes, medical centers, etc., while allowing caregivers, nursing assistants, doctors, etc. the ability to remotely access and monitor the medical device 30. This can be used to remotely troubleshoot issues that a patient may be having with the medical device 30 or to provide assurance that a patient or caregiver is properly adhering to parameters set forth by a doctor, such as changing dressings on time. The remote access can also be used to notify parties, such as the medical center or a manufacturer, when general maintenance on the medical device 30 is required.

Figure 2:
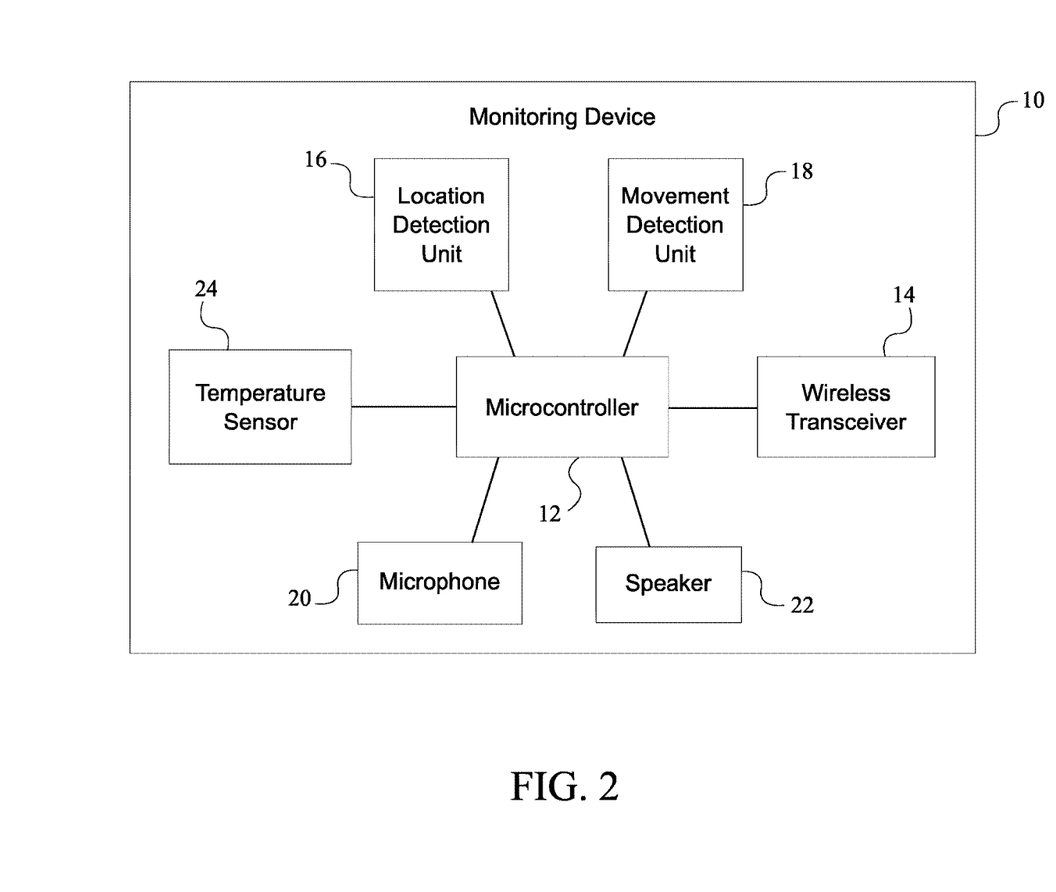
FIG. 2 is a diagram depicting the electrical connections between the microcontroller and the other components of the monitoring device.

In reference to FIG. 2, in addition to the microcontroller 12 and the transceiver 14 previously mentioned, the monitoring device 10 includes a location detection unit 16, a motion detection unit 18, a temperature sensor 24, a microphone 20, and a speaker 22. The microcontroller 12, the transceiver 14, the location detection unit 16, the motion detection unit 18, and the temperature sensor 24 are configured to be operably disposed within the medical device 30, wherein the microcontroller 12, the transceiver 14, the location detection unit 16, the motion detection unit 18, and the temperature sensor 24 may be mounted as one unit or standalone. The microphone 20 and the speaker 22 may be positioned within the medical device 30 or integrated into the casing of the medical device 30 to provide greater clarity.

The microcontroller 12 provides a processing unit that is configured to send and receive signals with the main board 32, and may additionally have a storage device to save predetermined commands and settings. The main board 32 is a motherboard, or other similar device, that controls the operations of the medical device 30 and communicates with a plurality of sensors 34 of the medical device 30. The microcontroller 12 is configured to be communicably coupled to the main board 32 either wirelessly or through a wired connection.

Figure 4:
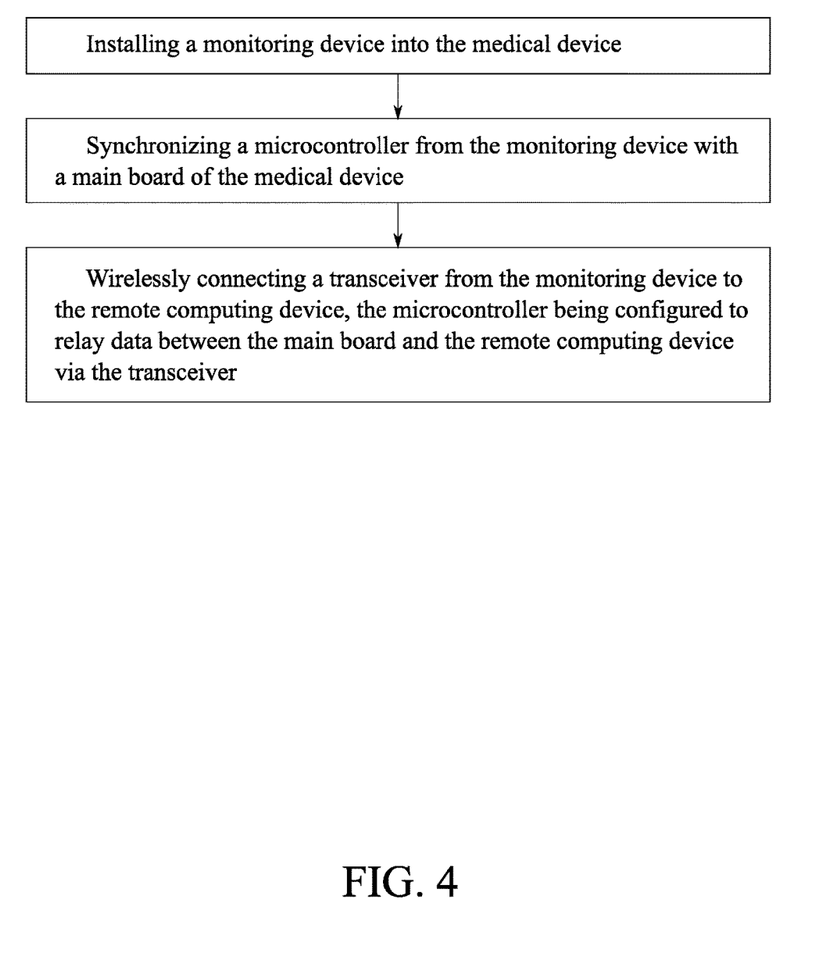
FIG. 4 is a flowchart depicting the steps for modifying the medical device to communicate with the remote computing device via the monitoring device.

In reference to FIG. 4, the monitoring device 10 is first installed within the medical device 30, and the microcontroller 12 then is synchronized with the main board 32, either through a wireless or wired connection. The microcontroller 12 is coded to communicate back and forth with the main board 32, such that the microcontroller 12 is able to control and monitor the main board 32. Once the microcontroller 12 is synchronized with the main board 32, the transceiver 14 is wirelessly connected to the remote computing device 40. The transceiver 14 is electrically connected to the microcontroller 12 as depicted in FIG. 2, such that the microcontroller 12 can relay data between the main board 32 and the remote computing device 40 via the transceiver 14.

Figure 10:
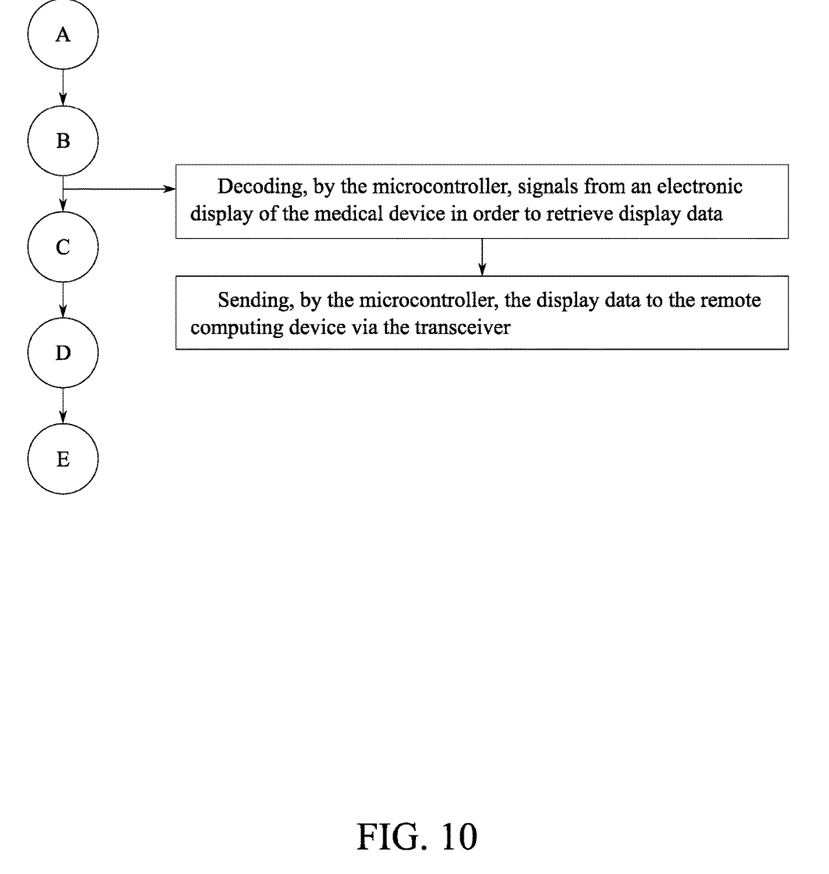
FIG. 10 is a flowchart thereof, further depicting steps for retrieving information from an electronic display of the medical device.

Furthermore, the microcontroller 12 is electronically connected to an electronic display of the medical device 30. In reference to FIG. 10, the microcontroller 12 is configured to decode signals from the electronic display in order to retrieve display data, wherein the microcontroller 12 can then relay the display data to the remote computing device 40 via the transceiver 14. The display data may include sensor readings, power states, medical alerts, or any other pertinent information that the electronic display is configured to present to a user. It is possible for the microcontroller 12 to be directly wired to the electronic display, or indirectly via the main board 32. The electronic display can be any type of display interface, such as a liquid crystal display (LCD) screen or a light emitting diode (LED) screen.

Figure 3:
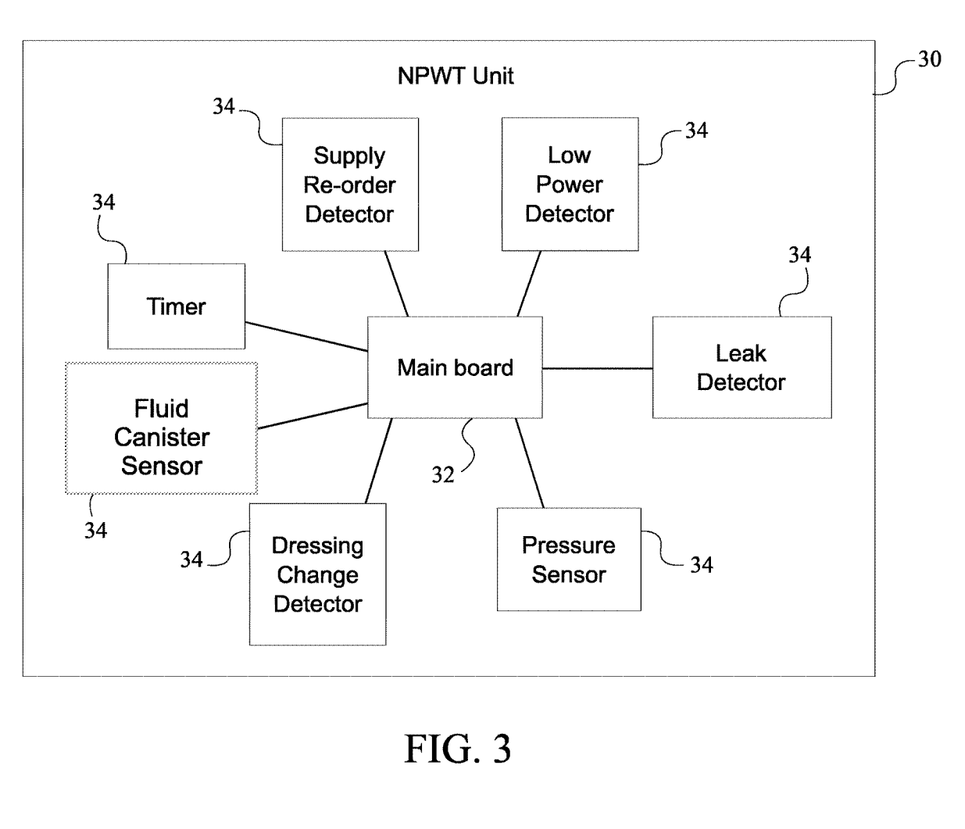
FIG. 3 is a diagram depicting exemplary implementations of the plurality of sensors, wherein the medical device is a negative pressure wound therapy unit.
Figure 5:
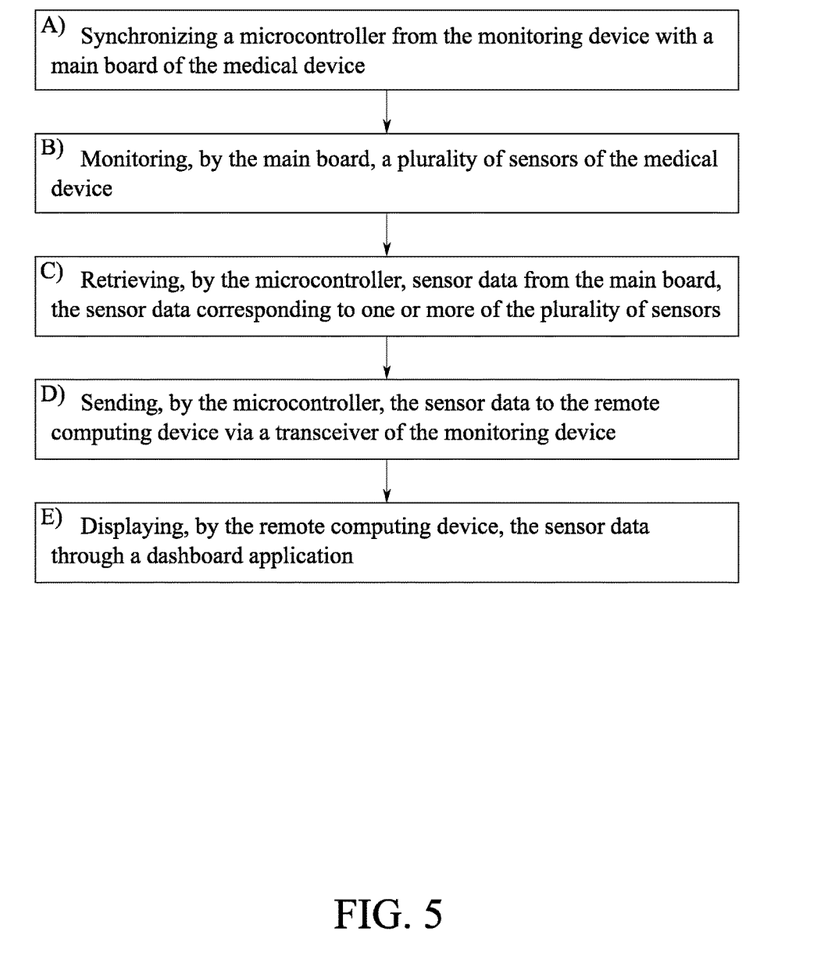
FIG. 5 is a flowchart depicting steps for retrieving data from the medical device and displaying the data to a user through the dashboard application.

In reference to FIG. 5, the main board 32 monitors the plurality of sensors 34 to ensure that the proper medical treatment is being provided. In reference to FIG. 3, for a NPWT unit, the plurality of sensors 34 may include a leak detector, a dressing change detector, a fluid sensor, a supply re-order detector, a low power detector, and a pressure sensor. The plurality of sensors 34 collects sensor data which is sent to the main board 32 and stored in memory; the sensor data corresponding to one or more of the plurality of sensors 34. The microcontroller 12 can then retrieve the sensor data from the main board 32 and send the sensor data to the remote computing device 40 via the transceiver 14. The sensor data may be preprocessed by the main board 32, processed by the microcontroller 12, or a combination thereof.

In further reference to FIG. 5, the sensor data is sent to the remote computing device 40 via a telecommunication network, internet network, or similar wireless network. The remote computing device 40 can then display the sensor data through the dashboard application. The dashboard application may depict the sensor data using charts, graphs, or anything or desirably means of visually presenting the sensor data to the user. In the preferred embodiment of the present invention, the dashboard application provides a digital representation of the medical device 30 and the associated sensors and indicators.

In order to access the dashboard application, a user must be registered with the back-end system that supports the dashboard application and must have a unique identifier and a password. When opening the dashboard application, the user is presented with a login portal, wherein the user is prompted to enter the unique identifier and the password to gain access to the user interface of the dashboard application. Once logged in the user can remotely control the medical device 30 and retrieve the desired sensor data through the remote computing device 40. The features accessible through the dashboard application may vary depending on the user. For example, a user account for a doctor may be given more privileges than the user account of a patient.

The dashboard application can be used by the user to remotely initiate one or more of a plurality of medical device 30 functions, such as turning the medical device 30 on and off, resetting the medical device 30, and adjusting the settings of the medical device 30 among other functions. Commands can be entered through the user interface of the dashboard application or through voice commands dictated to the remote computing device 40. Once a command has been sent to the microcontroller 12 and carried out by either the microcontroller 12 or the main board 32, the user interface is updated accordingly or an audial confirmation of the command is dictated through the remote computing device 40.

Alternative to using the dashboard application, the microphone 20 can be used by the user to initiate one or more of the plurality of medical device 30 functions. The microphone 20 is electrically connected to the microcontroller 12, such that audial signal picked up by the microphone 20 are relayed to the microcontroller 12. The audial signals are then processed by the microcontroller 12, wherein the microcontroller 12 instructs the main board 32 to perform the desired function. The speaker 22, which is electrically connected to the microcontroller 12, can then be used to provide an audial confirmation that the desired function has been carried out.

Figure 9:
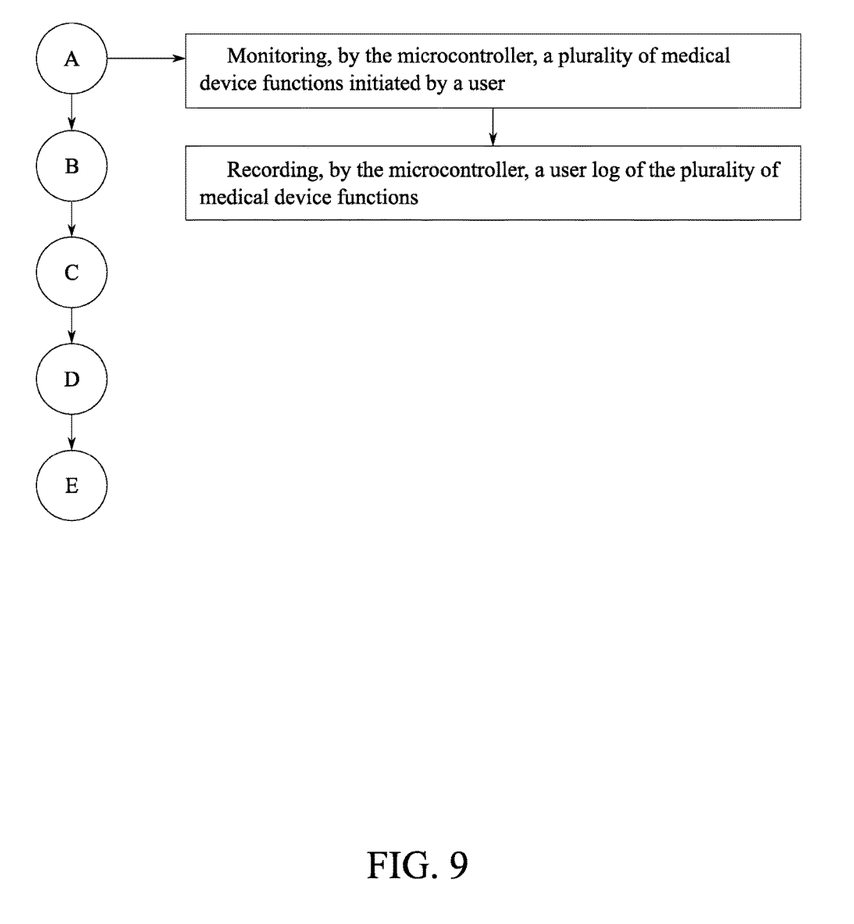
FIG. 9 is a flowchart thereof, further depicting steps for recording a user log of functions initiated on the medical device by a user.

Another method for initiating one or more of the medical device 30 functions is through a manual control of the medical device 30, such as a control knob or touch screen. In reference to FIG. 9, through all methods of input, the microcontroller 12 monitors the plurality of medical device 30 functions initiated by the user and records a user log of the plurality of medical device 30 functions. In this way, the present invention can be used by doctors or other medical officials to monitor patient compliance and ensure that the medical device 30 is being used properly. The user log may additionally be used to record how long the medical device 30 has been used, when the medical device 30 is turned on or off, or is reset.

The microcontroller 12 also provides the ability to send alerts and notifications to the remote computing device 40 if an undesirable state is determined by the microcontroller 12. The alerts are sent from the microcontroller 12 to the remote computing device 40 over a wireless communication network. The alerts may be sent to the remote computing device 40 through the dashboard application, sent as an email, sent as a short message service (SMS) notification, or sent using any other desirable wireless standard. If the alerts are sent to through the dashboard application, the remote communication device will signal that an alert has been received and the user must then log into the dashboard application in order to view the full details of the alert.

Figure 6:
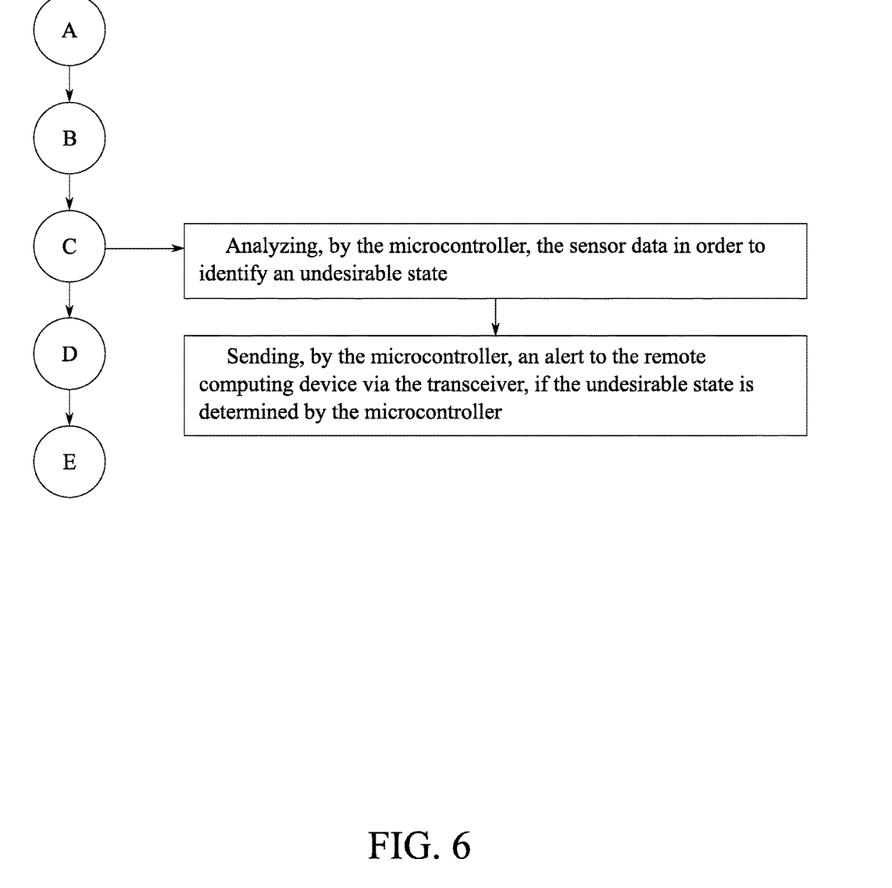
FIG. 6 is a flowchart thereof, further depicting steps for sending an alert if the microcontroller detects an undesirable state, such as an unfilled canister, low power, a broken pressure seal, etc.

In reference to FIG. 6, the microcontroller 12 analyzes the sensor data gathered from the plurality of sensors 34 in order to identify the undesirable state. When the undesirable state is determined through a particular sensor reading or abnormalities in the sensor data, the microcontroller 12 sends the alert to the remote computing device 40 via the transceiver 14. The following provides examples of situations in which an alert may be sent from the microcontroller 12 to the remote computing device 40. If the readings from the leak detector indicates there is a leak, the microcontroller 12 will notify the user of the leak and the location of the leak. If the fluid sensor detects that a canister is low, the microcontroller 12 will alert the user to refill the canister. If the low power detector notices a drop in power, the microcontroller 12 alerts the user to plug in the medical device 30, recharge the battery, etc. If the pressure sensor detects a decrease pressure around the mmHg seal on a patient, then the microcontroller 12 can alert the user of the potential leak.

The microcontroller 12 may also notify the user when a dressing needs to be changed or when supplies need to be re-ordered; in general, dressings can only be worn by patients for a maximum of 72 hours. A timer, integrated into either the main board 32 or the microcontroller 12, is used to track the time from the last documented dressing change or order of supplies. When a preset time has expired, the microcontroller 12 alerts the user that the dressing needs to be changed or that supplies need to be reordered.

Furthermore, the microcontroller 12 can be used to notify medical officials when settings have been changed by the patient or another caregiver. This allows for remote oversight of the medical device 30 to ensure that the medical device 30 is being utilized properly. The dashboard application also allows medical officials to perform a system lock remotely to prevent patients from adjusting parameters or to prevent unauthorized users from controlling the medical device 30.

Figure 7:
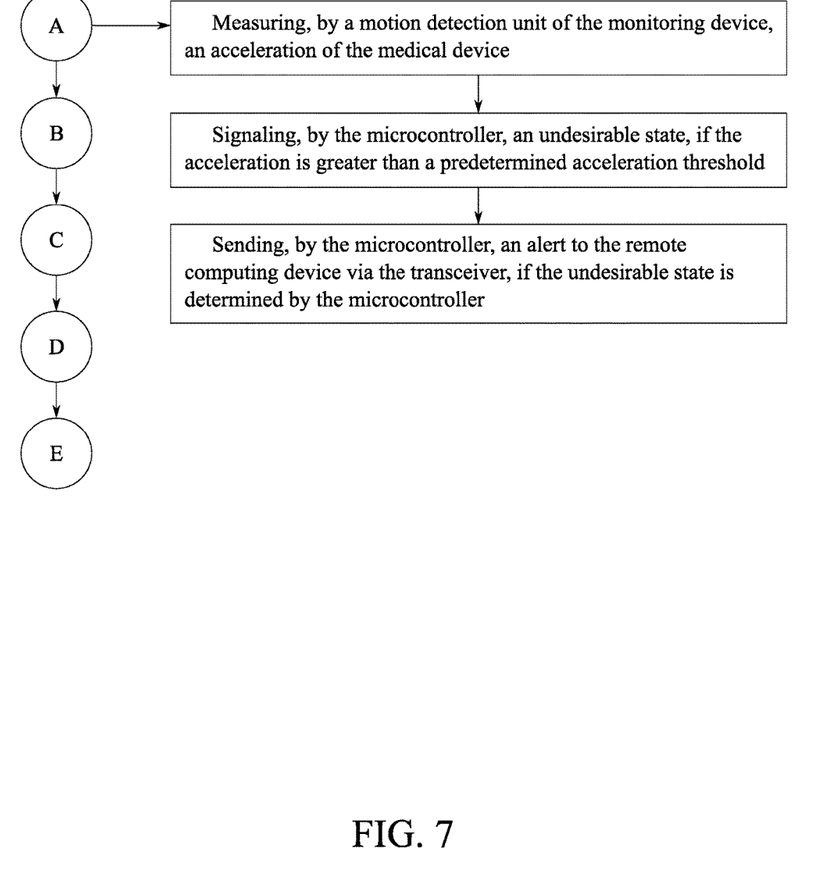
FIG. 7 is a flowchart thereof, further depicting steps for sending an alert if microcontroller detects the medical device has been dropped.

The motion detection unit 18 is used to detect if the medical device 30 has been dropped or otherwise mishandled. The motion detection unit 18 is electrically connected to the microcontroller 12 and configured to be operably disposed within the medical device 30 along with the microcontroller 12. In reference to FIG. 7, the motion detection unit 18 measures an acceleration of the medical device 30 using an accelerometer, a gyroscope, or similar sensor. If the acceleration measured by the motion detection unit 18 is greater than a predetermined acceleration threshold programmed into the microcontroller 12, then the microcontroller 12 sends alerts the user through the remote communication device that the medical device 30 has been dropped or mishandled.

Figure 8:
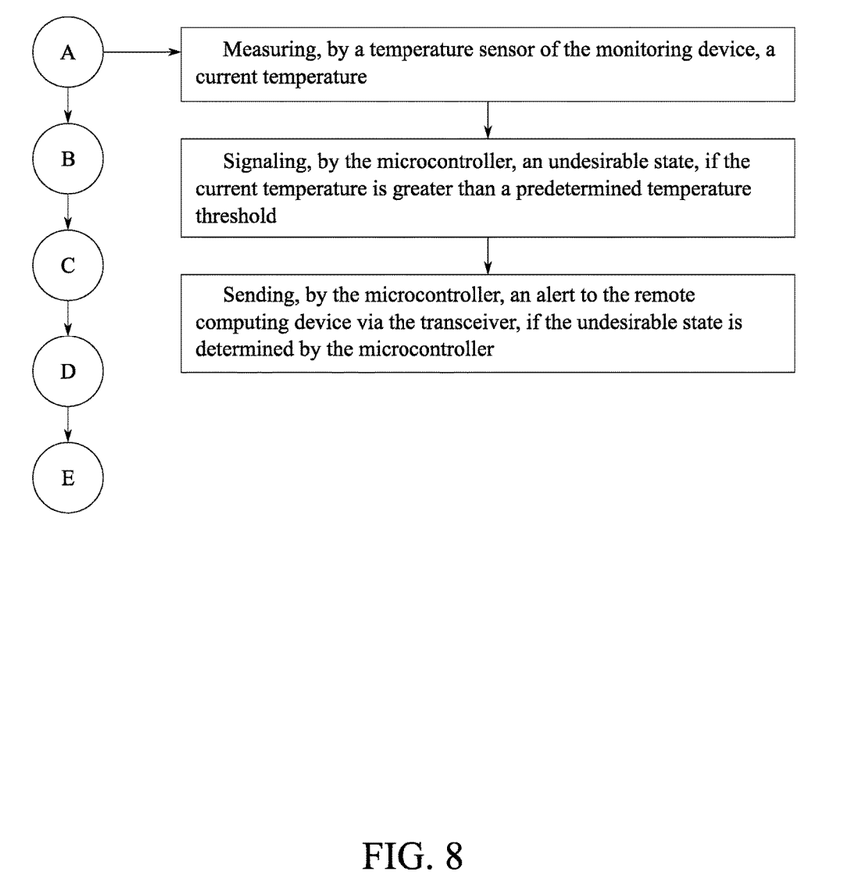
FIG. 8 is a flowchart thereof, further depicting steps for sending an alert if the microcontroller detects the medical device or the monitoring device is overheated.

Another type of alert is for the temperature of the microcontroller 12 and/or the medical device 30. In reference to FIG. 8, the temperature sensor 24 is used to measure a current temperature of the microcontroller 12 and/or the medical device 30. If the current temperature measured by the temperature sensor 24 is greater than a predetermined temperature threshold programmed into the microcontroller 12, then the microcontroller 12 sends alerts the user through the remote communication device that the medical device 30 or the monitoring device 10 is overheating. The user can then power off the device or perform other measures to cool the medical device 30 or the microcontroller 12 and prevent damage or fires.

The location detection unit 16 is electrically connected to the microcontroller 12 and is configured to be operably disposed within the medical device 30. The location detection unit 16 is utilized to track the current location of the medical device 30 using positional navigation standards such as the global positioning system (GPS). This allows the user to track the location of the medical device 30 through the dashboard application to ensure the medical device 30 does not get stolen, is with the stated location of the patient, etc.

In some embodiments, the present invention may be utilized in conjunction with a new type of film drape. The drape is useful as it signifies if there is a leak or compromised seal. The drape will turn a specific color in the place of the leak, thus signifying where said leak is located. This will allow clinicians and other medical workers to quickly fix the compromised seal in an efficient and timely manner.

The present invention can also be configured to provide compliance rating metrics or compliance reports to the patient, caregiver, doctor, etc. The compliance rating metrics and the compliance reports can be compiled by the microcontroller 12 or the back-end system used to host the dashboard application. The sensor data is gathered from the plurality of sensors 34 by the microcontroller 12, wherein the sensor data is analyzed and compared to pre-determined data in order to generate the compliance rating metrics and the compliance reports. The predetermined data may include patient vitals, such as heart rate or blood pressure, prescription doses, drug administration schedules, etc.

The compliance rating metrics may measure one or more areas of patient compliance by comparing the sensor data to the predetermined data. The compliance rating metrics may be used to predict patient outcomes, the effect on the chance and rate of healing, the success rate of a prescribed treatment, etc. The compliance report is a compilation and summary of the compliance rating metrics and the overall compliance of the patient or caregiver with the prescribed treatment. The compliance report and/or the compliance rating metrics are sent from either the microcontroller 12 or the back-end system to the remote computing device, wherein the patient, caregiver, doctor, etc. can review patient compliance.

Although the invention has been explained in relation to its preferred embodiment, it is to be understood that many other possible modifications and variations can be made without departing from the spirit and scope of the invention as hereinafter claimed.

What is claimed is:

1. A medical system comprising:
   a monitoring device;
   a medical device;

a remote computing device;
a microphone;
a speaker;
the monitoring device comprising a microcontroller, a transceiver, a location detection unit, a temperature sensor and a motion detection unit;
the microcontroller, the transceiver, the location detection unit, the temperature sensor and the motion detection unit being operably disposed to the medical device;
the transceiver, the location detection unit, the temperature sensor and the motion detection unit being electrically connected to the microcontroller;
the medical device comprising a main board, a leak detector, a fluid canister sensor, a low power detector and a pressure sensor;
the leak detector, the fluid canister sensor, the low power detector and the pressure sensor being electrically connected to the main board;
the microcontroller being communicably coupled to the main board;
the microcontroller being configured to send and receive signals with the main board;
the microcontroller detecting a current location of the medical device via the location detection unit;
the microcontroller detecting movement of the medical device via the motion detection unit;
the transceiver being wirelessly coupled to the remote computing device;
the microcontroller being communicably coupled to the remote computing device via the transceiver;
the microcontroller detecting a current temperature of the medical device via the temperature sensor;
the microphone being electrically connected to the microcontroller;
the microcontroller being configured to receive voice commands via the microphone;
the speaker being electrically connected to the microcontroller; and
the microcontroller being configured to output audio via the speaker.

2. The medical system as claimed in claim 1, wherein the transceiver is configured to communicate via a telecommunication network.

3. The medical system as claimed in claim 1, wherein the transceiver is configured to communicate via an internet network.

4. The medical system as claimed in claim 1, wherein the microcontroller is configured to record a user log.

5. A method of utilizing a medical system comprising steps of:
providing a medical system, the medical system comprising a monitoring device, a medical device, a remote computing device, a microphone and a speaker, the monitoring device comprising a microcontroller, a transceiver, a location detection unit, a temperature sensor and a motion detection unit, the microcontroller, the transceiver, the location detection unit, the temperature sensor and the motion detection unit being operably disposed to the medical device, the transceiver, the location detection unit, the temperature sensor and the motion detection unit being electrically connected to the microcontroller, the medical device comprising a main board, a leak detector, a fluid canister sensor, a low power detector and a pressure sensor, the leak detector, the fluid canister sensor, the low power detector and the pressure sensor being electrically connected to the main board;
communicably coupling the microcontroller to the main board;
synchronizing the microcontroller with the main board;
monitoring, by the main board, the leak detector, the fluid canister sensor, the low power detector and the pressure sensor;
retrieving, by the microcontroller, sensor data from the main board, the sensor data corresponding to one or more of the leak detector, the fluid canister sensor, the low power detector and the pressure sensor;
sending, by the microcontroller, the sensor data to the remote computing device via the transceiver;
displaying, by the remote computing device, the sensor data through a dashboard application;
sending, by the microcontroller, an alert to the remote computing device via the transceiver, if an undesirable state is determined by the microcontroller;
analyzing, by the microcontroller, the sensor data in order to identify the undesirable state;
detecting, by the location detection unit, a current location of the medical device;
measuring, by the motion detection unit, an acceleration of the medical device;
signaling, by the microcontroller, the undesirable state, if the acceleration of the monitoring device is greater than a predetermined acceleration threshold;
measuring, by the temperature sensor, a current temperature of the monitoring device;
signaling, by the microcontroller, the undesirable state, if the current temperature of the monitoring device is greater than a predetermined temperature threshold;
electrically connecting the microphone to the microcontroller, the microcontroller being configured to receive voice commands via the microphone; and
electrically connecting the speaker to the microcontroller, the microcontroller being configured to output audio via the speaker.

6. The method as claimed in claim 5 comprising steps of:
monitoring, by the microcontroller, a plurality of medical device functions initiated by a user; and
recording, by the microcontroller, a user log of the plurality of medical device functions.

7. The method as claimed in claim 6, wherein one or more of the medical device functions is initiated from a manual control of the medical device.

8. The method as claimed in claim 6, wherein one or more of the medical device functions is monitored through the dashboard application.

9. The method as claimed in claim 6, wherein one or more of the medical device functions is monitored through the microphone.

10. The method as claimed in claim 5, wherein the transceiver is configured to communicate via a telecommunication network.

11. The method claimed in claim 5, wherein the transceiver is configured to communicate via an internet network.

12. The method as claimed in claim 5 comprising steps of:
decoding, by the microcontroller, signals from an electronic display of the medical device in order to retrieve display data; and
sending, by the microcontroller, the display data to the remote computing device via the transceiver.

13. The method as claimed in claim 5 comprising steps of:
wirelessly connecting the transceiver of the monitoring device to the remote computing device, the microcontroller being configured to relay the sensor data between the main board and the remote computing device via the transceiver.

14. The medical system as claimed in claim 1 comprising:
the medical device comprising a dressing change detector and a supply re-order detector; and
the dressing change detector and the supply re-order detector being electrically connected to the main board.

15. The medical system as claimed in claim 1 comprising:
the motion detection unit comprising an accelerometer.

16. The method as claimed in claim 5, wherein the medical device comprises a dressing change detector and a supply re-order detector, and the dressing change detector and the supply re-order detector are electrically connected to the main board.

17. The method as claimed in claim 16 comprising steps of:
monitoring, by the main board, the dressing change detector and the supply re-order detector.

18. The method as claimed in claim 16, wherein the sensor data corresponds to one or more of the dressing change detector and the supply re-order detector.

19. The method as claimed in claim 5, wherein the motion detection unit comprises an accelerometer.

* * * * *